UNITED STATES PATENT OFFICE.

ERNST KRAUSE, OF STEGLITZ, NEAR BERLIN, AND HANS BLÜCHER, OF LEIPZIG-GOHLIS, GERMANY.

PROCESS OF MAKING PLASTIC MASSES.

1,238,528.      Specification of Letters Patent.      Patented Aug. 28, 1917.

No Drawing.      Application filed June 12, 1917. Serial No. 174,360.

*To all whom it may concern:*

Be it known that we, ERNST KRAUSE and HANS BLÜCHER, subjects of the Emperor of Germany, and residents of Steglitz, near Berlin, and Leipzig-Gohlis, respectively, in the German Empire, have invented certain new and useful Improvements in Processes of Making Plastic Masses, of which the following is a description.

Our invention refers to plastic masses and more especially to plastic masses prepared by aid of formaldehyde. Its particular object is an improved process for making such masses.

In an earlier application for patent filed August 20, 1915, Serial Number 46587, we have described and claimed a method of making plastic masses by treating yeast or any other albuminous substances, preferably in a dry state, with formaldehyde, disintegrating and drying the product of reaction and molding it under the combined action of heat and pressure. By that method there are obtained horn- or ebonite-like compositions adapted to have their properties varied by the aid of additions of oil, tar, resin, glue, gelatin, asphaltum, sulfur and other substances. Other substances reacting with formaldehyde, such as for instance phenols, could be added to the products thus obtained and they could also be converted into softer products resembling rubber, leather or the like by admixing with them softening agents of some suitable sort.

We have now ascertained that the yeast or other albuminous substances hitherto employed may be replaced with advantage by albumin-containing waste products obtained in the manufacture of beer, alcohol, and alcoholic beverages in general. In the process of brewing there is obtained a residue of the hopped wort which is deposited mainly in the cooler, such residue (the "trub") consisting of pectin substances, albuminous matter, resin-like and other substances. Of the waste products resulting in the process of distilling the distiller's wash (the so-called "schlempe",) which is known to contain different albuminous substances, can be used to advantage. These waste products upon being dried and treated with formaldehyde yield a material adapted to be converted, under the combined action of heat and pressure, into plastic masses, which show properties similar to those of hard rubber, leather or soft rubber, according to whether they are mixed with other appropriate substances or not.

The residue obtained from the wort-cooler may be used to advantage conjointly with the hop-residues deposited at the same time, the hop-leaves acting as filling bodies. It is further feasible to employ the said residues and the residues of molasses, such as vinasse, together with yeast or other albuminous substances.

The masses obtained with their aid can be varied as far as their physical properties are concerned by admixing with them some or other of the aforesaid additions. The masses may further be subjected to a supplementary treatment with suitable indurating agents, such as formaldehyde, chromium salts and the like.

Example I: 1 kg. of the hopped-wort residue described above (the so-called "trub") is agitated with 150 grams of a 40 per cent. solution of formaldehyde. The mixture is then dried, ground and pressed in molds at a temperature of 90 degr. C., the pressure amounting to 300 kgs. per square centimeter.

In employing the so-called "trub" according to this process its content of resinous matter is a source of some trouble. For this reason we prefer removing the resin by extraction with suitable solvents before starting the reaction between the "trub" and formaldehyde.

We have further ascertained that the resin can be rendered harmless without being extracted, by causing an alkali to act upon the "trub." We may employ some alkali carbonate, but caustic alkali, such as caustic potash, soda or ammonia is preferable.

Experience has further shown that the alkali treatment results in a number of other advantages, the albuminous substances as well as any cellulose which may be present in the said product being rendered far more capable of reacting. If, after treating the raw products with alkali, they are mixed with formaldehyde, the mixture being then dried, if necessary, before subjecting it to the action of heat and pressure, the favorable influence of the alkali treatment can be ascertained from the fact that compression then results in a very intimate combination of the cellulose and the hardening albuminous substance. This influence exerted by the alkali still remains even when it is neutralized subsequent to its action upon the mixture.

Finally the alkali - treatment has been shown to exert a hardening influence of its own upon the mixture subjected to the action of heat and pressure, it being possible to partly or totally replace the formaldehyde by alkali.

Example II: 5 kgs. of trub, well washed, are treated with 5.5 per cent. of a 40 per cent. solution of caustic soda, the product being then mixed with 950 grams of sawdust. The mixture may be dried and is then subjected to a pressure of 100 kgs. per square centimeter at a temperature exceeding 80 C. degr.

We claim:—

1. The process which consists in causing albumen-containing waste products obtained in the manufacture of alcoholic beverages to react with formaldehyde, drying the resulting mass and subjecting it to the combined action of heat and pressure.

2. The process which consists in causing the residue from hopped wort settling in the cooler to react with formaldehyde, drying the resulting mass and subjecting it to the combined action of heat and pressure.

3. The process which consists in causing the residue from hopped wort settling in the cooler and the vinasse from molasses to react with formaldehyde, drying the resulting mass and subjecting it to the combined action of heat and pressure.

4. The process which consists in causing albumen-containing waste products obtained in the manufacture of alcoholic beverages to react with formaldehyde, drying the resulting mass, admixing to it suitable filling substances and subjecting it to the combined action of heat and pressure.

5. The process which consists in causing albumen-containing waste products obtained in the manufacture of alcoholic beverages to react with formaldehyde, drying the resulting mass, admixing to it substances adapted to influence the physical properties of the final product, and subjecting it to the combined action of heat and pressure.

6. The process which consists in causing albumen-containing waste products obtained in the manufacture of alcoholic beverages to react with formaldehyde, drying the resulting mass, subjecting it to the combined action of heat and pressure and treating the product thus obtained with an indurating agent.

7. The process which consists in causing albumen containing waste products obtained in the manufacture of alcoholic beverages to react with an alkali, drying the resulting mass and subjecting it to the combined action of heat and pressure.

8. The process which consists in causing albumen-containing waste products obtained in the manufacture of alcoholic beverages to react with an alkali, treating with formaldehyde, drying the resulting mass and subjecting it to the combined action of heat and pressure.

In witness whereof we have hereunto set our hands in the presence of witnesses.

ERNST KRAUSE.
HANS BLÜCHER.

Witnesses:
  HENRY HASPER,
  ALLEN F. JENNINGS,
  RUDOLPH FRICKE,
  R. H. SEAGLE.